(12) United States Patent
Ruchonnet

(10) Patent No.: US 8,498,180 B2
(45) Date of Patent: Jul. 30, 2013

(54) CLOCK WORK MOVEMENT FOR A WRISTWATCH

(75) Inventor: Jean-Francois Ruchonnet, Mont-sur-Rolle (CH)

(73) Assignee: LVMH Swiss Manufactures SA, La Chaux-de-Fonds (CH)

(*) Notice: Subject to any disclaimer, the term of this patent is extended or adjusted under 35 U.S.C. 154(b) by 0 days.

(21) Appl. No.: 12/651,059

(22) Filed: Dec. 31, 2009

(65) Prior Publication Data

US 2010/0195449 A1 Aug. 5, 2010

Related U.S. Application Data

(63) Continuation of application No. 11/030,676, filed on Jan. 6, 2005, now Pat. No. 7,697,376, which is a continuation of application No. PCT/CH03/50301, filed on Jul. 9, 2003.

(30) Foreign Application Priority Data

Jul. 9, 2002 (CH) ................................ 2002CH1188

(51) Int. Cl.
*G04B 19/00* (2006.01)
*G04B 19/04* (2006.01)
*G04B 1/10* (2006.01)

(52) U.S. Cl.
USPC ............... 368/76; 368/80; 368/140; 368/148; 368/220; 368/223

(58) Field of Classification Search
USPC .................. 368/25, 40, 76, 77, 80, 140, 142, 368/208–208, 222, 223, 228, 232, 235, 281, 368/309, 147, 206
See application file for complete search history.

(56) References Cited

U.S. PATENT DOCUMENTS

| | | | |
|---|---|---|---|
| 1,572,097 A | 2/1926 | Walters |
| 1,676,030 A | 7/1928 | Helin |
| 1,893,882 A | 1/1933 | Burke |
| 1,914,015 A | 6/1933 | Hatot |

(Continued)

FOREIGN PATENT DOCUMENTS

| | | |
|---|---|---|
| CH | 60360 | 6/1912 |
| CH | 337789 A | 4/1959 |

(Continued)

OTHER PUBLICATIONS

URL: http://en.wikipedia.org/wiki/Movement_(clockwork) (retrieved Sep. 14, 2012).*

(Continued)

*Primary Examiner* — Vit W Miska
(74) *Attorney, Agent, or Firm* — Blank Rome LLP

(57) ABSTRACT

Clockwork movement for a wristwatch, comprising a kinematic chain including at least one belt (20, 21) for transmitting the movements and/or couples between at least two pulleys. The pulleys are held on the bottom plate or the bridges by ball bearings (151, 161, 171, 181). The movement is rewound by means of linear oscillating mass (14) charging four barrels (15, 16, 17, 18) through a couple distributor (40). The barrels are non-parallel to one another. The back cover is covered by inclined glasses (110, 120, 130) allowing the barrels, the linear oscillating mass and at least certain pulleys to be seen. The regulating organ (51) is removable.

23 Claims, 6 Drawing Sheets

U.S. PATENT DOCUMENTS

| | | | |
|---|---|---|---|
| 2,024,066 A | | 12/1935 | Segovia |
| 2,221,413 A | | 11/1940 | Schanz |
| 2,431,968 A | | 12/1947 | Sparkes |
| 2,494,011 A | | 1/1950 | Stein |
| 2,506,134 A | | 5/1950 | Burchell |
| 2,790,300 A | | 4/1957 | Lux |
| 2,952,967 A | | 9/1960 | Nussle |
| 3,659,412 A | * | 5/1972 | Miyasaka et al. .............. 368/37 |
| 3,695,035 A | * | 10/1972 | Cleusix .......................... 368/22 |
| 3,732,687 A | * | 5/1973 | Miyasaka et al. .............. 368/35 |
| 3,736,805 A | | 6/1973 | Dent |
| 3,759,592 A | | 9/1973 | Carlson |
| 3,889,545 A | | 6/1975 | Baublys et al. |
| 3,942,316 A | * | 3/1976 | Van Haaften ................. 368/88 |
| 3,956,879 A | | 5/1976 | Bailey |
| 3,977,176 A | * | 8/1976 | Murakami et al. ........... 368/159 |
| 4,033,110 A | * | 7/1977 | Sagarino ...................... 368/159 |
| 4,103,484 A | | 8/1978 | Bailey |
| 4,250,223 A | | 2/1981 | Cook |
| 4,290,317 A | | 9/1981 | Hehl |
| 4,316,277 A | * | 2/1982 | Endo .............................. 368/76 |
| 4,363,553 A | | 12/1982 | Thomi et al. |
| 4,852,072 A | | 7/1989 | Sullivan |
| 4,934,992 A | | 6/1990 | Simon et al. |
| 4,956,828 A | | 9/1990 | Yamada |
| 4,972,392 A | | 11/1990 | Willington |
| 5,065,375 A | | 11/1991 | Gogniat |
| 5,105,398 A | | 4/1992 | Hayakawa et al. |
| 5,130,956 A | | 7/1992 | Ueda |
| 5,199,006 A | | 3/1993 | Ferrara |
| 5,278,807 A | * | 1/1994 | Mathys ........................ 368/140 |
| 5,303,211 A | | 4/1994 | Yanaka et al. |
| 5,943,302 A | | 8/1999 | Fanshaw |
| 6,172,943 B1 | * | 1/2001 | Yuzuki ......................... 368/204 |
| 6,402,368 B1 | | 6/2002 | Grimm et al. |
| 6,485,172 B1 | | 11/2002 | Takahashi et al. |
| 6,619,836 B1 | * | 9/2003 | Silvant et al. ................ 368/281 |
| 6,693,852 B2 | * | 2/2004 | Koike et al. .................. 368/204 |
| 8,113,707 B2 | | 2/2012 | Jolidon |
| 2001/0009410 A1 | | 7/2001 | Fujita |

FOREIGN PATENT DOCUMENTS

| | | | |
|---|---|---|---|
| CH | 538715 A | | 11/1972 |
| DE | 499642 C | | 6/1930 |
| DE | 20206965 | | 8/2002 |
| EP | 0509965 | | 10/1992 |
| EP | 0573839 | | 12/1993 |
| EP | 0620509 | A1 | 10/1994 |
| EP | 0677796 | | 10/1995 |
| EP | 1115040 | | 7/2001 |
| EP | 03762695 | | 7/2006 |
| GB | 281385 A | | 12/1927 |
| GB | 1166256 | | 10/1969 |
| JP | 48097570 A | | 12/1973 |
| JP | 55025793 A | | 2/1980 |
| JP | 61144491 A | | 7/1986 |
| JP | 62073287 A | | 4/1987 |
| JP | 1-197688 A | | 8/1989 |
| JP | 1-313791 A | | 12/1989 |
| JP | 2033388 A | | 2/1990 |
| JP | 2-136782 A | | 5/1990 |
| JP | 2133698 A | | 5/1990 |
| JP | 4120389 A | | 4/1992 |
| JP | 04126195 | | 11/1992 |
| JP | 7223583 A | | 8/1995 |
| JP | 11183645 A | | 7/1999 |
| JP | 2000014936 A | | 1/2000 |
| KR | 2002023553 | | 3/2002 |
| KR | 382796 | | 12/2003 |

OTHER PUBLICATIONS

URL: http://www.fhs.ch/berner/?l=en (retrieved Sep. 14, 2012).*
URL: http://www.merriam-webster.com/dictionary/movement (retrieved Sep. 14, 2012).*
URL: http://www.rotarywatches.com/en/service/watch-terminology (retrieved Sep. 14, 2012).*
http://watchluxus.com/knowledge/glossary/m.*
Popular Science "Best of What's New: Gadgets", published by Popular Science, 2 pgs., www.popsci.com/popsci/bown/2004/gadgets/article/0.22221,750006.00.html.
Tag Heuer's Radical News V4 Watch Movement, published online by Gizmag.com, 10 pgs., www.gizmag.com/go/2903/.
Tag Heuer Chronographs Powered by Avant-garde Movements, published online by Dexigner.com, 5 pgs., www.dexigner.com/about/.
Tag Heuer Monaco V4, Released at Baselworld, published online by ProfessionalWatches.com, 17 pgs., www.professionalwatches.com/2007/04/.
Tag Heuer Monaco V4, Goes into Production, published online by Gizmag.com, 4 pgs., www.gizmag.com/go/7209.
Tag Heuer Monaco V4, Concept Watch Red Dot "Best of Best" Award, 2 pgs., www.en.red-dot.org/2028.html.
Ronda AG—Product overview, htttl://www.ronda.ch/en/products/overview/[Apr. 6, 2012 18:55:38], 10 pages.
Soprod SA—Mechanical, http://soprod.ch/EN/Mecanique.htm[Apr. 6, 2012 19:04:13], 2 pages.
Eta SA—Collection: Mechanical Movements, Swiss Made, Manufacture Horlogere Suisse, 3 pages.

* cited by examiner

CLOCK WORK MOVEMENT FOR A WRISTWATCH

REFERENCE DATA

This application is a continuation of U.S. application Ser. No. 11/030,676, filed Jan. 6, 2005, U.S. Pat. No. 7,697,376, which is a continuation of International Patent Application PCT/EP03/50301 (WO04006026) filed on Jul. 9, 2003, claiming priority of Swiss patent application 2002CH-1188 of Jul. 9, 2002, the contents of which are hereby incorporated by reference.

FIELD OF THE INVENTION

The present invention concerns a clockwork movement for a wristwatch, in particular a transmission device for a clockwork.

DESCRIPTION OF RELATED ART

Wristwatches having a mechanical movement have become luxury objects and are thus subjected to numerous changes dictated by fashion. The casing was the first element to be adapted to personalized shapes, then it was the bracelet's turn to undergo transformation with different shapes and materials and closing devices. Finally came the watch's interior and mechanism. More and more, the clockwork movement was the object of mechanical complications demonstrating the ingenuity of the different systems and the know-how of the master watchmaker. It is obvious that there lie most possibilities and that nothing can stop the creator's imagination.

The usual mechanical watches comprise an energy accumulator constituted by a barrel, a counting organ or gear train, a regulating organ, or distribution, comprising an escapement and a sprung balance that determine the watch's running, as well as a display generally realized by hands on a dial. The present invention concerns more particularly the kinematic chain of energy transmission and the movements between these different elements. In conventional mechanical movements, as well as in quartz movements, the couples and the movements are transmitted between the different mobile elements of a watch by means of gears. Thus, the barrel spring, when let down, drives the barrel's drum in rotation, then from gear to gear until the escapement pinion and until the hands. The gears are constituted by toothed wheels or by racks engaging directly with one another.

The gears are an efficient energy transmission means and their reliability has been borne out. During the course of the reflection that led to the invention, it has however been observed that they impose a certain number of constraints on the clockwork manufacturers. Thus, the axes of the two wheels of a gear must be parallel or possibly perpendicular; random orientation axes are only possible with conical gears that are costly, difficult to manufacture and poorly efficient. For this reason, clockwork movements are almost always built around a bottom plate and mutually parallel bridges. Therefore, clockwork movements almost always include two main faces that are plane and parallel to one another, any other geometry imposing constraints that would be difficult to overcome for realising the gear train.

In the case of watches having of large diameter, a flat movement is not always optimal; a curved shape, for example a concave shape adapted to the wrist or a convex shape allowing the skin to breathe, is often desirable. It would also be desirable to be able to display the hands or other indicators non-parallel to the dial, for example on the lateral faces of the watch or in an oblique plane. These embodiments are however difficult to realize with cylindrical gears having parallel axes.

The gears transmit the energy efficiently only when the two engaged wheels are perfectly aligned and correctly spaced. In a watch, it is therefore necessary to fasten the axes of the wheels and of the pinions with extremely high accuracy, which increases the manufacturing costs. Minimal displacements caused by a shock or an acceleration can block the gear; it is thus necessary to use rigid axes fastened to the bottom plate and to the bridges by means of shock-proof means, for example stones and Incabloc™ bearings. These elements are expensive, fragile and difficult to assemble. Furthermore, the teeth of the gear's components must imperatively be made of hard metal in order to limit their wear and guarantee an optimal contact even after several years of functioning.

The gears further have the inconvenience of requiring a lubrication that must periodically be repeated.

The gears are also poorly suited to driving wheels or mobiles that are far removed from one another within a movement, in which case a chain of gears must be used which increases the movement's cost, reduces its reliability and requires additional axes. Another solution that is expensive and requires a lot of space is to increase the diameter of the two wheels of the gear.

Finally, the two wheels of a gear mandatorily turn in opposite directions; when it becomes necessary to have them turn in the same direction, an intermediate wheel or pinion must be used, which increases the movement's cost and requires more space in the already limited space of the movement. For example, the minutes' wheel cannot engage directly with the hours' wheel nor with the seconds' wheel, since the three corresponding hands must turn in the same direction.

One aim of the present invention is thus to propose a clockwork movement that avoids these inconveniences.

Another aim is to use alternative means in the kinematic chain of a clockwork movement, causing a reaction of surprise by the choice of an unusual technology.

Another aim is to propose a clockwork movement with an alternative and new design that makes possible constructions and designs different from those of conventional movements.

BRIEF SUMMARY OF THE INVENTION

According to the invention, these aims are achieved by means of a clockwork movement having the characteristics of claim 1, preferred embodiments being furthermore described in the description.

In particular, these aims are achieved by a clockwork movement designed to be integrated in a wristwatch case and comprising at least one belt for transmitting the movements and/or the couples between at least two pulleys (i.e. between a driving pulley and at least one driven pulley).

By replacing one or several gears by an ensemble formed of two pulleys and a belt, one first achieves a reaction of surprise, in particular if the belts are visible through the watch's back cover or through the dial.

Furthermore, the different pulleys connected by a same belt can be oriented in different planes, which grants additional freedom to the clockwork manufacturer in designing a new movement.

The other problems of the aforementioned gears are also resolved.

The term of belt must be interpreted broadly in said application to include smooth belts or toothed belts, chains, bands and cables for transmission between pulleys. However, in a preferred embodiment, the belt used is a belt made at least partially of synthetic material and provided with notches (teeth).

Document CH61963 describes a clockwork movement comprising a kinematic chain incorporating a chain between two pulleys. The movement described is designed for a clock and could not without great difficulties be integrated within a wristwatch, where it would not produce the advantages sought in this document.

Wall or table clocks provided with chains and belts are also described in U.S. Pat. No. 1,667,685, U.S. Pat. No. 2,494,011, U.S. Pat. No. 4,320,480, U.S. Pat. No. 5,105,398, U.S. Pat. No. 4,022,015 and U.S. Pat. No. 467,662. All these documents however concern large-size clocks, whose movement cannot in any case be miniaturized to be accommodated within a wristwatch.

FR391702 describes a wristwatch that indicates the time by means of a perforated band that encircles the wrist and is driven by two wheels. The time can be read by checking the position of an indicator on the band around the wrist. The reading is particularly awkward when the mobile indicator is on the outside lateral side of the wrist and is thus difficult to see. This solution is adapted only to an extremely particular type of watch that certainly does not satisfy all the needs and tastes of the users; the described movement absolutely cannot be integrated within a more conventional watchcase. Furthermore, the band used constitutes an indicator to replace the hands, but is not designed to transmit the movements nor the couples in a kinematic chain between two pulleys. The two wheels in contact with this band are in fact both transmission wheels.

BRIEF DESCRIPTION OF THE DRAWINGS

The invention will be better understood by with the aid of the description of an embodiment given by way of example and illustrated by the figures, in which:

FIG. 7 shows a cross section of the linear oscillating mass of the inventive clockwork movement.

DETAILED DESCRIPTION OF THE INVENTION

Figure 1:
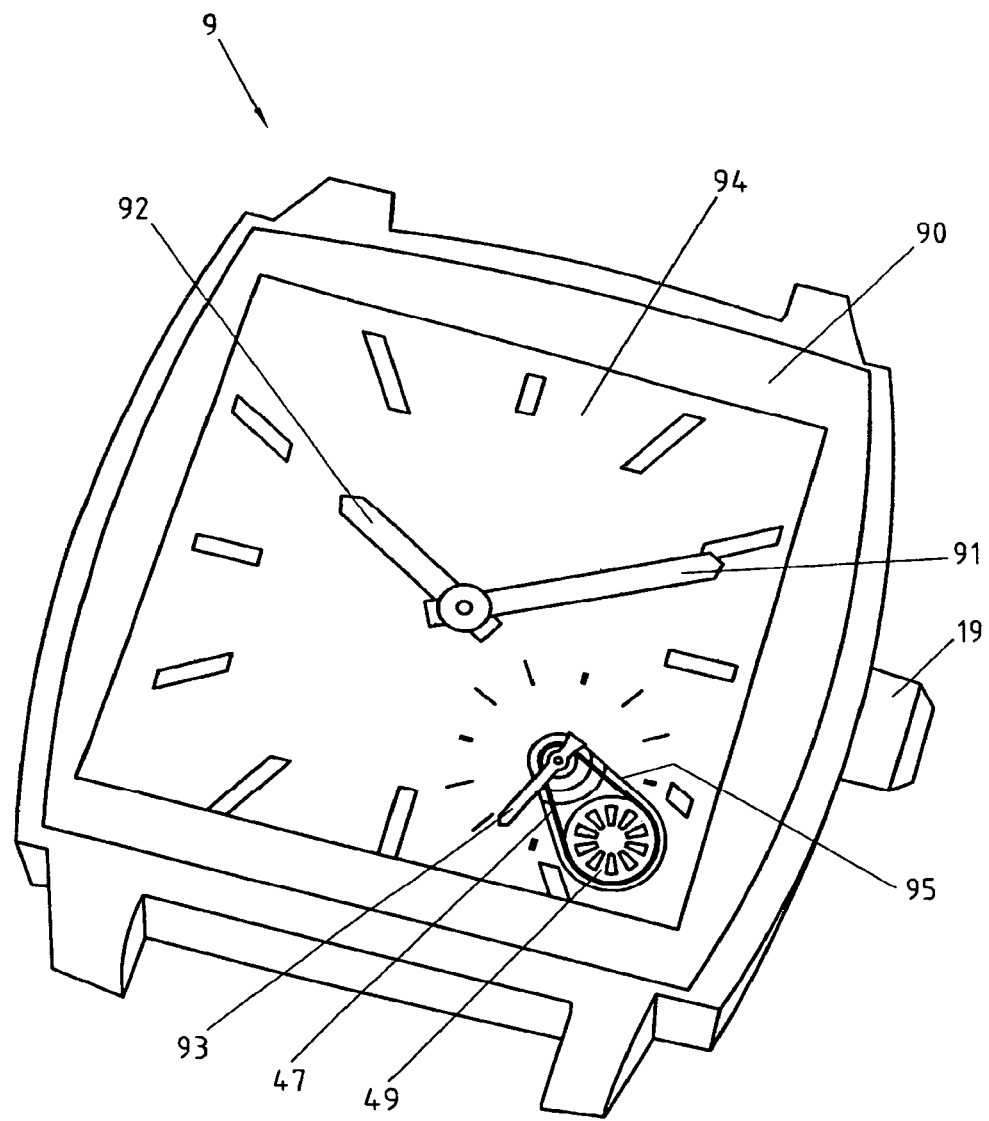
FIG. 1 shows a view from above of a wristwatch including a clockwork movement according to the invention.

A watch 9 equipped with a clockwork movement according to the invention is illustrated by way of example in FIG. 1. The watch comprises a case 90 making it possible to case up the movement from the bottom, as will be seen. A winding and resetting button 19, connected to a removable rewinding and resetting module 62 (FIG. 4) allows to rewind and/or reset the watch. A minutes' hand 91 and an hours' hand 92, as well as a small-seconds' hand 93 at 16 h 30 move over a dial 94 to display the time. The dial comprises at least one opening 95 enabling at least part of the movement to be seen, preferably a part of the movement comprising a belt or a substantial length of a belt, as will be seen further below.

In another embodiment, not illustrated, the watch is of the skeleton type, i.e. lacking a dial, and the hands move directly above the movement. In yet another embodiment, not illustrated, the dial is constituted of a glass or synthetic material that is opaque for an observer' looking straight at it and transparent when it is inclined with respect to the viewing direction. This embodiment, which can incidentally be used in combination with any watch movement, allows to distinguish easily the hands above the dial when the latter is inclined in reading position, and to check the movement's running simply by orienting the watch in a preferential direction. In another embodiment, the dial could be constituted of a liquid crystal cell that is opaque when resting and transparent when a tension between the two faces orients the crystals differently.

Figure 2:
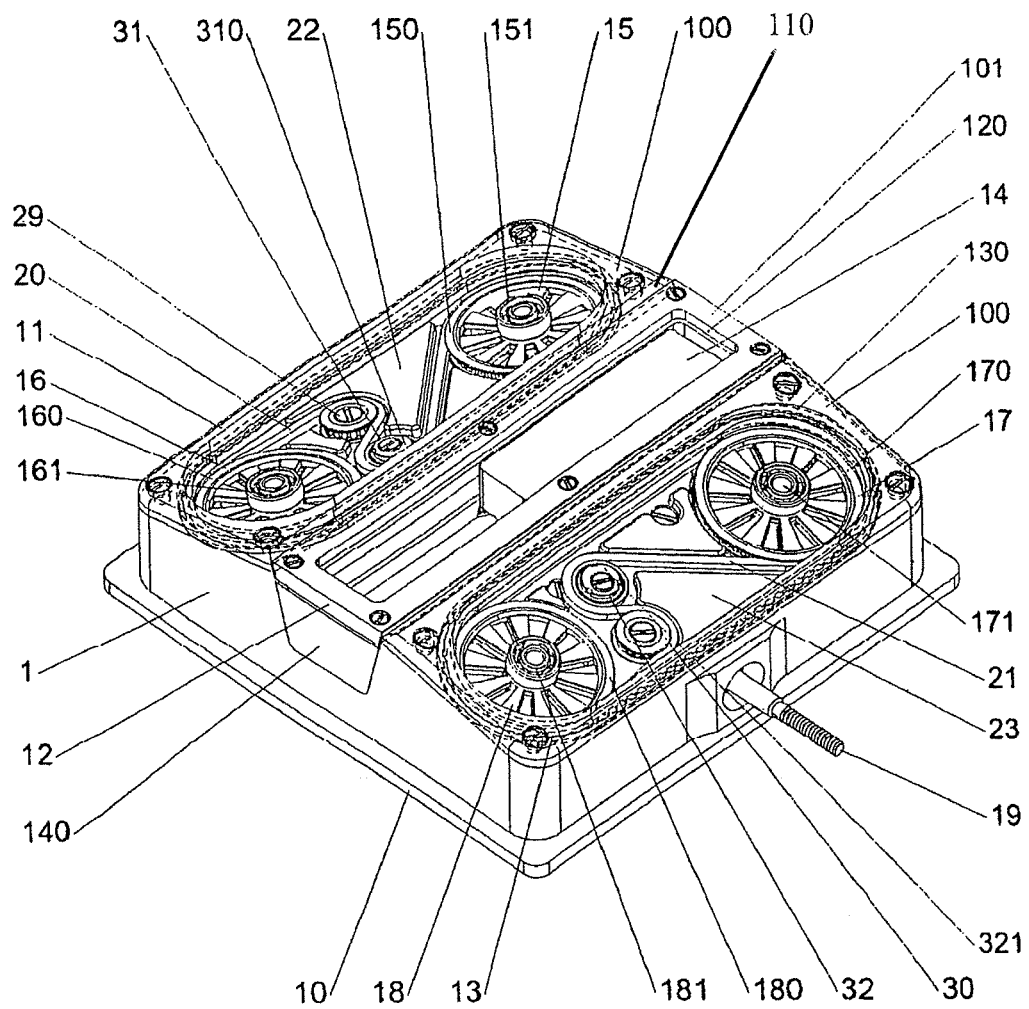
FIG. 2 shows a three-quarter perspective view of a clockwork movement according to the invention.
Figure 3:
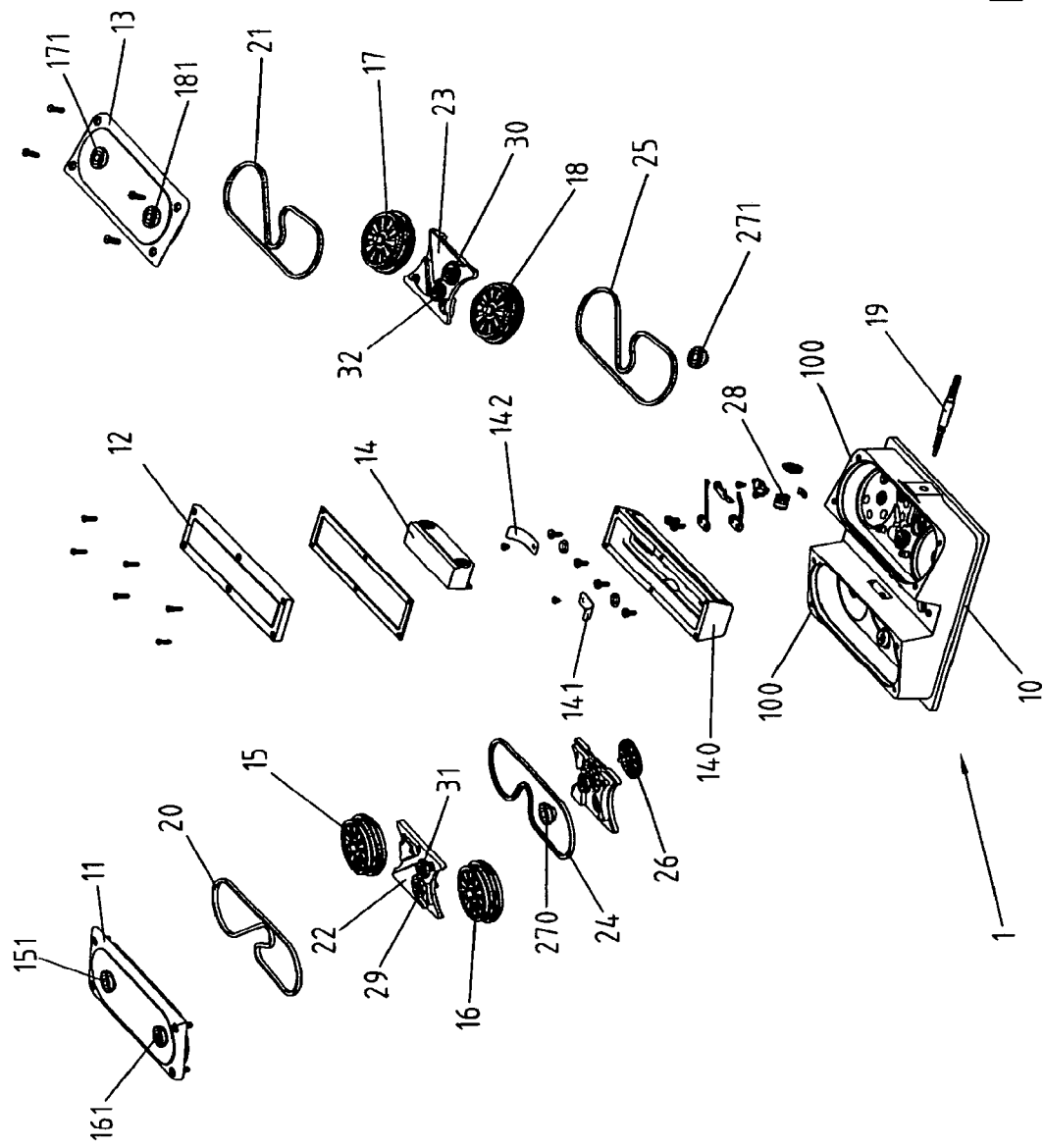
FIG. 3 shows a partially exploded view of the 2 0 inventive clockwork movement.
Figure 4:
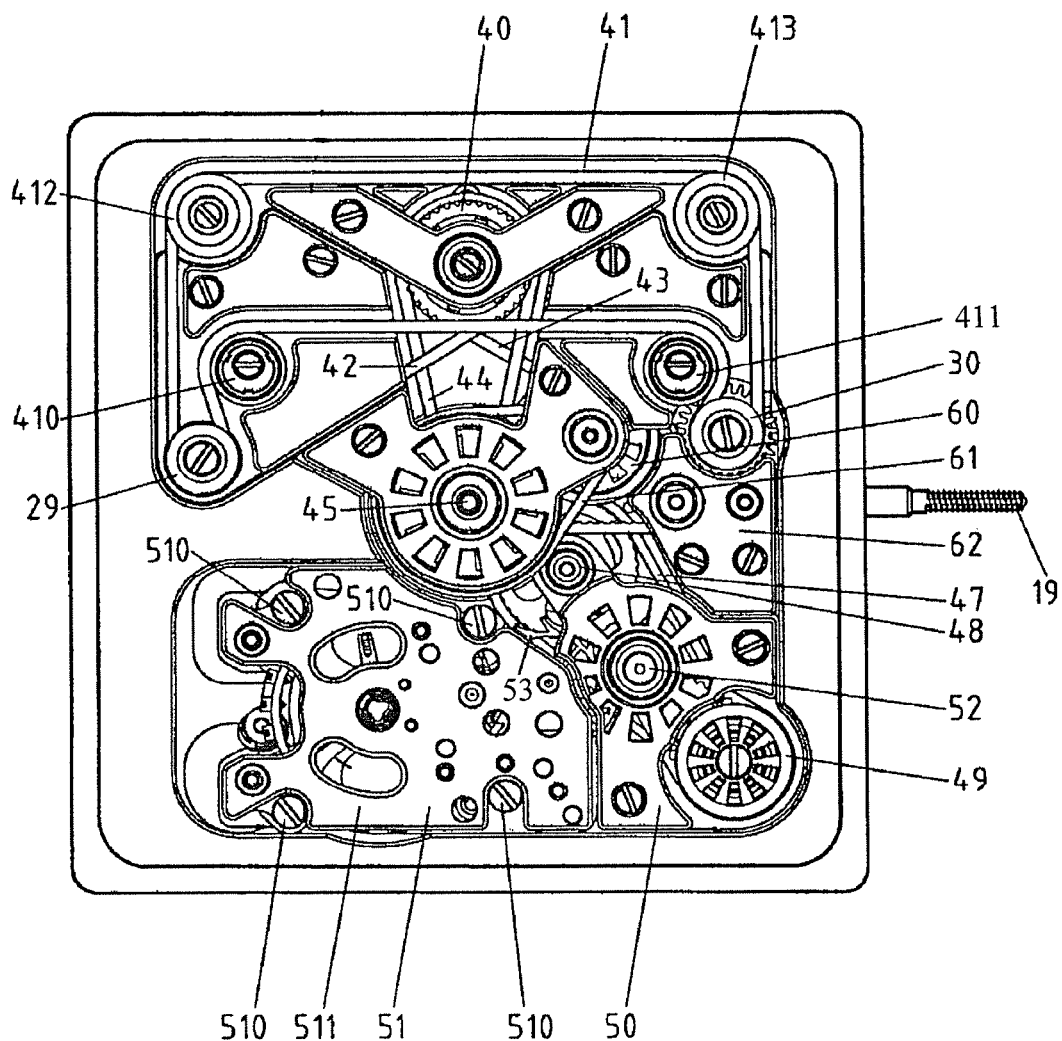
FIG. 4 shows a view from above of the inventive movement as seen through the bottom plate.

An example of a movement according to the invention is illustrated in FIGS. 2 to 4. The movement is constructed around a chassis 1 provided with a bottom plate 10 and a back cover 11, 12, 13 comprising two oblique faces 100 inclined in this example by about 13° relatively to the bottom plate. The central portion 12 between the two inclined faces 11 and 13 is parallel to the bottom plate 10 and to the dial 94. The convex shape of the back cover makes it possible to reduce the resting surface between the back of the watch and the wrist and to reduce the problems of perspiration.

According to an independent characteristic of the invention, the back of the movement constitutes directly the back cover of the watch; the plane central portion 12 of the movement's back is thus directly in contact with the wearer's wrist. The movement's back cover 11, 12, 13 is preferably made water-resistant by means of gaskets, not referenced, in order to prevent humidity infiltration into the movement.

In order to control the movement's running, the faces 11, 12, 13 are closed by glasses 110, 120, 130 respectively. In the example represented, each glass is held by a frame (not referenced) screwed individually onto the chassis 1.

The movement comprises four barrels 15, 16, 17 and 18 parallel to the two inclined faces 100 and provided with spring in order to store the energy necessary for actuating the movement. The barrels' axes are thus not perpendicular to the bottom plate. The two extremities of each axis are held by ball bearings, the upper bearings 151, 161, 171 and 181 being visible in FIGS. 2 and 3. The barrel springs are recharged by the displacement of an oscillating mass, in this example a linear oscillating mass 14 moving under the effect of the wearer' movements in a slide-way 140 under the central glass 120. The lower face of the oscillating mass 14 is provided with a rack 146 (FIGS. 6 5 and 7) that actuates a pinion 28 with a horizontal axis driving the left countershaft 29 through the gear 26 or through a gear train.

The four barrels are each provided with two toothed pulleys, only the pulleys 150, 160, 170 and 180 close to the back cover being visible in FIG. 2. The two barrels 15 and 16 are connected serially by means of a left rewind belt 20 engaging with the first pulleys 150, 160 and of a left discharge belt 24 (FIG. 3) engaging with the second pulleys, not referenced. A left upper bridge 22 separates the two belts 20 and 24 in the path between the two barrels 15, 16. The belts 20 and 24 are tightened by means of a tightener 31 provided with an eccentric portion 310 and acting on the dorsal face of the belts; by regulating the angular position of the eccentric portion 310 by means of the screw, not referenced, the length of the belt path is modified so as to regulate its tightness. The belt 20 further engages with the charge pulley 29 of the left barrels. The displacements of the oscillating mass 14 are thus transmitted to the belt 20 through the gears 28 and 26 and of the charge pulley 29 to recharge the two barrels 15 and 16.

In the same manner, the two barrels 17 and 18 are connected serially by means of a right rewind belt 21 engaging with the first pulleys 170, 180 and of a right discharge belt 25 engaging with the second pulleys, not referenced, a right upper bridge 23 separating the two belts. The tightness of the belts 21, 25 can be regulated through the back cover by acting on the eccentric portion 321 of the tightener 32. A charge pulley of the right barrels 30 is driven by the belt 21.

The pulley 29 on the path of the belt 20 drives the pulley 30 on the path of the belt 21 by means of the toothed belt 41, visible in FIG. 4 illustrating a view from below, through the movement's bottom plate 10. The belt 41 extends about pulleys 412, 413, and is tightened by the two tighteners 410 and 411 provided with eccentric portions. The oscillations of the mass 14 are thus also transmitted to the second pair of barrels 17, 18.

The belt 24 connecting the second pulleys of the first pair of barrels 15, 16 drives a discharge pulley 270 actuating a left distributor belt 42, of which only a portion is visible in FIG. 4. The belt 42 drives the upper plate of the couple distributor 40 whose function will be described further below.

In the same manner, the belt 25 connecting the second pulleys of the second pair of barrels 17, 18 drives a second discharge pulley 271 actuating a right distributor belt 43, which drives the lower plate of the couple distributor 40.

The couple distributor 40 comprises two plates resting against one another through a plate holding spring, not represented. A plate is driven by the left belt 42 whilst the other plate is driven by the right belt 43. The two plates are provided with toothings mutually working together so that the couples transmitted by the two pairs of barrels 15-16 and 17-18 add up. The toothing of the two plates is however arranged so that a difference of couple between the two plates tends to move them apart against the force exerted by the spring. When this difference of couple becomes important, the separation between the distributor's two plates is such that the two gears unhook and jump a step; the difference of couple is thus absorbed by the plate holding spring. The couple distributor 40 can thus guarantee that the two pairs of barrels 15-16 and 17-18 supply an approximately constant couple, even if the barrel springs do not have identical characteristics.

A belt 44 connects the couple distributor 40 to the hours' pulley (not represented) on the pipe of the hands 45 in the centre of the movement. The hours' pulley directly actuates the hours' hand 92, as well as the motion-work pulley 60 through the minutes' belt 61. The motion-work pulley 60 drives the minutes' hand 91 through a gear or an additional belt, not represented.

The rotations of the motion-work pulley 60 are further transmitted through a gear train and/or belts, not represented, to the small-seconds' pulley 48 that drives a small-seconds' belt 47 tightened by a countershaft 49 at 16 h 30. An additional pulley, or a gear actuated by the belt 47, enables the pipe of the small-second 50 to be driven in order to drive the small-seconds' hand 93.

A removable regulating organ 51 mounted on a bridge 511 is fastened by screws 510 to the bottom plate 10. The regulating organ can be entirely adjusted outside the movement and then mounted after adjustment, only a second level fine-tuning by means of a single screw of the index-assembly being then necessary to adapt the running of the watch to each movement. The regulating organ comprises several elements and is situated in the same plane as other organs (for example 40) connected to the chassis.

The adjustment is thus greatly facilitated since all the regulation points are easily accessible when the regulating organ is disassembled. The regulating organ can be conventional, karussel, tourbillon or even electronic and comprises in this example an escapement 53 of which a portion is visible in FIG. 4. It is connected by a gear train, not represented, or by an additional belt, with the small-seconds' wheel coaxial with the small-seconds' pipe 52.

Thus, nearly all of the gear train of the traditional clockwork movements is replaced by belts and pulleys. In particular, the kinematic chain between the barrels and the hands' pipe is entirely constituted of belts. Furthermore, the usual bearings and rubies are at least partially replaced by ball bearings holding the pulley axes. The tolerances on the positioning of the axes during the movement's assembly can thus be relaxed since the belts can absorb errors in parallelism or in spacing between pulleys that can even be relatively important. Furthermore, it is possible to place the pulleys in planes that are not parallel to one another, which gives the clockwork manufacturer an additional designing freedom. For example, belts can also be used for transporting an index, a hand or any type of indicator on the dial, on the lateral side or on an oblique surface of the watch, of the horns or of the bracelet. The use of belts, pulleys and gimbal suspensions further makes it possible to greatly facilitate the designing of movements comprising several bridges that are not parallel to one another.

The pulleys 29 and 30 are parallel to the barrels and to the inclined faces 100; their axes preferably comprise a gimbal suspension, or a double gimbal (not represented) enabling the pulleys or gears to be mounted parallel to the bottom plate 10. The axes of these two pulleys are thus connected to the bottom plate through a gimbal suspension.

Figure 5:
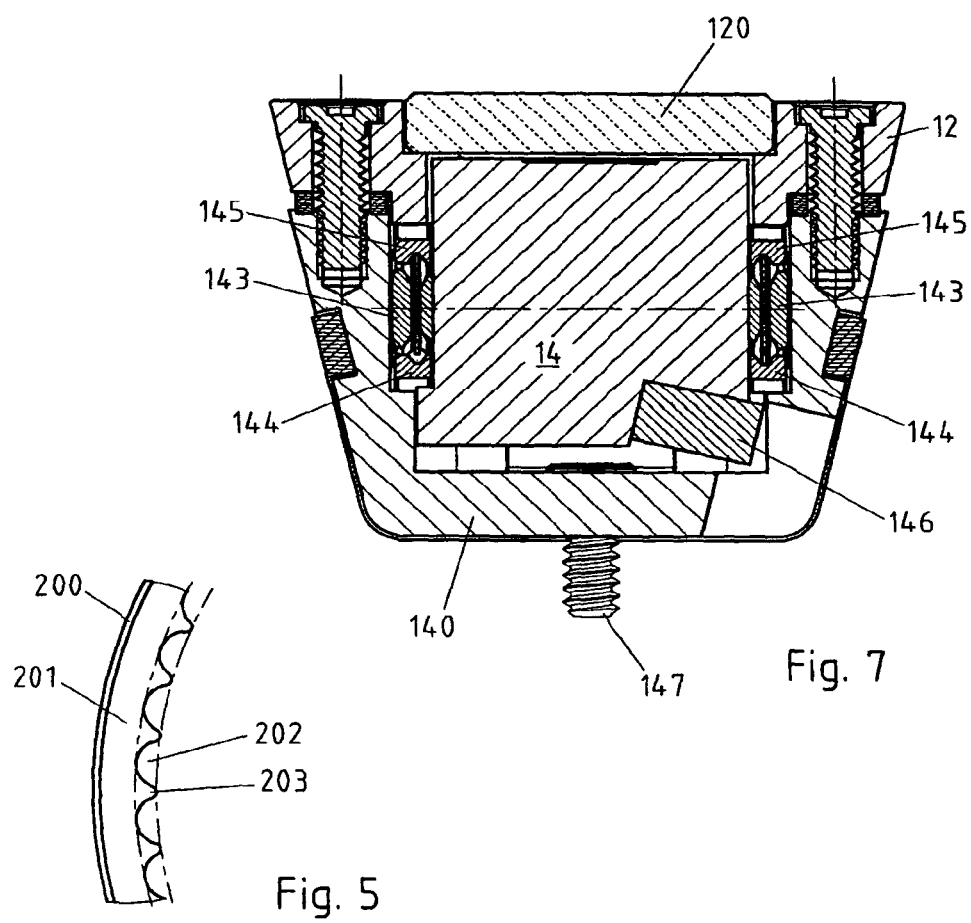
FIG. 5 shows a detail of a belt.

FIG. 5 illustrates by way of example a length of belt 200 according to the invention. Different constraints are placed on the belts of a movement:

Lengths and sections much smaller than those of known belts in other technical domains.

Continuous or near-continuous functioning with a minimum of wear and elongation.

Countershafts of greatly varying diameters.

Sufficiently elastic to be able to be tightened by means of tighteners and, if desired, to be corkscrewed between two non-parallel pulleys.

Sufficiently rigid so as to not leave the pulley, even in the case of considerable shocks.

According to the invention, the belt is constituted of a fine metallic substrate 201, which gives it the required firmness and transversal rigidity, onto which a greater layer of rubber or synthetic material is moulded and in which the teeth 203 are formed. In order to guarantee an acceptable angle of contact with the belt's teeth whatever the bending radius of the belt, the interstices 202 between two teeth 203 are preferably rounded, for example semicircular, parabolic or cycloid, whereas the belt's teeth 203 are limited to a fine edge between two interstices. Thus, even when the belt 200 is very closed, the interstice 202 between two teeth 203 remains sufficiently large to enable the pulley's teeth to be introduced therein. The shape and size of the teeth of different pulleys working with a same belt can also be adapted to the bending radius of the belt around the pulley.

Smooth belts or belts provided with teeth of different shapes can also be used within the framework of this invention.

Figure 6:
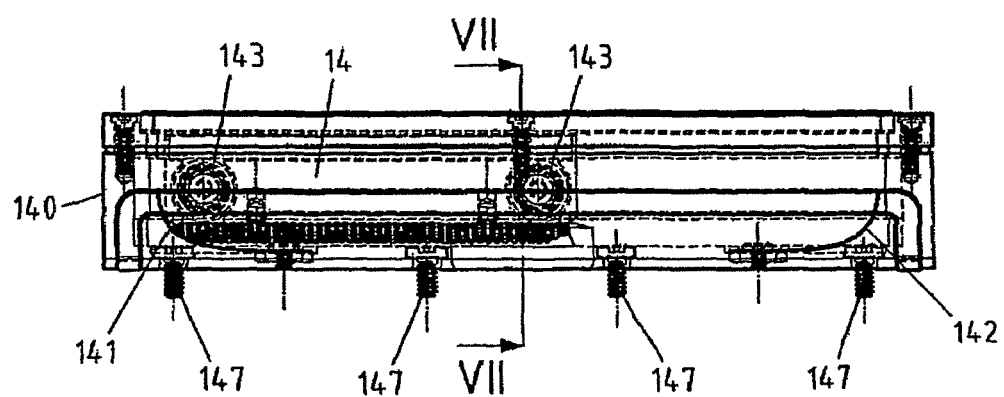
FIG. 6 shows a longitudinal section of the linear oscillating mass of the inventive clockwork movement.

FIGS. 6 and 7 illustrate by way of example the oscillating mass 14 used in the movement to recharge the barrels through the kinematic chain 26-28. According to the invention, the oscillating mass moves linearly in a slide-way 140. Pivoting oscillating masses can however also be used with pulley movements according to the invention; furthermore, the described oscillating mass can also be used with more conventional gear movements. The oscillating mass 14, which is visible through the back of the movement through the glass 120, is provided with four wheels 143 that allow it to slide between lower rails 144 and upper rails 145 along the slideway 140. The mass 14 moves under the gravitational pull and accelerations due to the movements of the wearer's wrist.

Springs 141 and 142, constituted in this example by bent flexible metallic blades, are placed at each extremity of the mass's travel in order to absorb shocks at the end of the run, to reduce the noise and to return the mass 14 in the other direction. Spiral or elastomer springs can also be used. A rack 146 on the base of the oscillating 30 mass 14 transmits the bi-directional linear movements of the mass 14 to the pinion 28 with a horizontal axis, which converts them into circular movements transmitted through a kinematic chain to recharge the four barrels 15, 16, 17, 19. The slide 140 is simply fastened by means of the screw 147 to the chassis 1.

Although the watch described comprises four barrels that are not parallel to one another and a couple distributor between these barrels, the one skilled in the art will understand that pulleys and belts can also be used with watches comprising a single barrel or any number of barrels.

The use of belts in a watch movement is also appropriate when a mobile or indicator must travel a trajectory that is long or of particular shape. In this case, the mobile or indicator can be borne directly by the belt. For example, it would be possible within the framework of this invention to use a belt bearing dates for a year indicator or to show moon phases, planet motions or tidal cycles.

The invention claimed is:

1. A wristwatch comprising a case, a dial and a clockwork movement integrated in said case behind said dial, said movement comprising:
   a bottom plate, said bottom plate having a first side and a second side directly behind said dial;
   at least one barrel mounted on said first side of said bottom plate;
   a kinematic chain, said kinematic chain comprising at least one belt for driving a driven pulley mounted on said first side of said bottom plate;
   at least one circularly rotating hand on said second side of said bottom plate; and
   a lower face, wherein said at least one belt is at least partially visible on said lower face;
   wherein said at least one barrel drives said at least one belt, which in turn drives said pulley, which in turn rotates said at least one circularly rotating hand.

2. The wristwatch of claim 1, wherein said at least one belt is tightened between a driving pulley and the driven pulley, said driving pulley having a diameter different from that of said driven pulley.

3. The wristwatch of claim 1, being of the mechanical type, wherein said at least one belt being provided in the kinematic chain between said at least one barrel and said at least one hand.

4. The wristwatch of claim 1, comprising at least one tightener for tightening said at least one belt.

5. The wristwatch of claim 1, at least one said belt being toothed.

6. The wristwatch of claim 5, said at least one belt comprising teeth and interstices between said teeth that are rounded and devoid of angles, said teeth being reduced to an edge.

7. The wristwatch of claim 1, said at least one belt being made by duplicate-molding a synthetic material onto a metallic substrate.

8. The clockwork movement of claim 1, comprising several organs mounted in a same plane of which at least one is removable.

9. The clockwork movement of claim 8, further comprising a removable regulating organ.

10. The clockwork movement of claim 9, wherein said regulating organ is adjustable from outside the movement and then mounted into the movement.

11. The clockwork movement of claim 1, further comprising a back cover and at least one gasket to make said back cover water-resistant.

12. The clockwork movement of claim 1, further comprising a back cover which is not flat.

13. The clockwork movement of claim 1, comprising an upper face and a back cover, wherein said upper face is not parallel to said back cover.

14. The clockwork movement of claim 1, wherein said at least one belt, said driven pulley and said barrel each have a plurality of teeth, and wherein the plurality of teeth of said at least one belt engage the plurality of teeth of said driven pulley to drive said driven pulley, and wherein the plurality of teeth of said barrel engage the plurality of teeth of said at least one belt to drive said at least one belt.

15. A wristwatch comprising a case, a dial and a clockwork movement integrated in said case behind said dial, said movement comprising:
   a bottom plate, said bottom plate having a first side and a second side directly behind said dial;
   at least one barrel mounted on said first side of said bottom plate;
   a kinematic chain, said kinematic chain comprising at least one belt for driving a driven pulley mounted on said first side of said bottom plate; and
   at least one circularly rotating hand on said second side of said bottom plate;
   wherein said bottom plate is in a first plane and said driven pulley is in a second plane which is non-parallel to the first plane, and said at least one barrel is in the second plane; and
   wherein said at least one barrel drives said at least one belt, which in turn drives said pulley, which in turn rotates said at least one circularly rotating hand.

16. A clockwork movement designed to be integrated in a case of a wristwatch, said movement comprising:
   a bottom plate;
   at least one barrel mounted on said first side of said bottom plate;
   a kinematic chain, said kinematic chain comprising at least one belt for driving a driven pulley on said first side of said bottom plate;
   at least one circularly rotating hand on a second side of said bottom plate;
   a linear oscillating mass for loading said at least one barrel; and
   a back cover, said linear oscillating mass being visible through said back cover;
   wherein said at least one belt drives said driven pulley, which in turn rotates said at least one circularly rotating hand.

17. The clockwork movement of claim 16, further comprising at least one linear rail, said linear oscillating mass comprising wheels for moving over said linear rail.

18. A clockwork movement designed to be integrated in a case of a wristwatch, said movement comprising:
   a bottom plate;
   at least one barrel mounted on said first side of said bottom plate;

a kinematic chain, said kinematic chain comprising at least one belt for driving a driven pulley on said first side of said bottom plate;

at least one circularly rotating hand on a second side of said bottom plate; and a linear oscillating mass for loading said at least one barrel, said linear oscillating mass moving between two ends of travel, elastic elements being provided at said ends of travel to return said linear oscillating mass;

wherein said at least one belt drives said driven pulley, which in turn rotates said at least one circularly rotating hand.

19. The clockwork movement of claim 18, said elastic elements being constituted by spring blades.

20. A clockwork movement designed to be integrated in a case of a wristwatch, said movement comprising:

at least one time indicating rotating seconds hand for indicating seconds;

at least one time indicating rotating minutes hand for indicating minutes;

at least one time indicating rotating hours hand for indicating hours;

wherein said at least one seconds hand, at least one minutes hand and at least one hours hand all being driven in rotation by a pulley, which in turn is driven by a belt, wherein said pulley and belt are located inside the movement.

21. A wristwatch comprising a movement according to claim 20.

22. The wristwatch of claim 21, said belt being within said case but at least partly visible from the outside of said wristwatch.

23. A wristwatch comprising:

a dial;

a wristwatch case, at least one glass closing one face of said case, a clockwork movement integrated in said wristwatch case and located entirely below the dial, said clockwork comprising at least one belt driving at least one pulley, which in turn drives a time indicating hand in rotation about a fixed axis, the at least one belt and at least one pulley located within the clockwork movement, at least one said belt being at least partially visible through said glass.

* * * * *